(12) United States Patent
Ito

(10) Patent No.: US 6,805,488 B2
(45) Date of Patent: Oct. 19, 2004

(54) LINEAR GUIDE RAIL HOLDING DEVICE

(75) Inventor: Takayoshi Ito, Ichinomiya (JP)

(73) Assignee: Infom Co., Ltd., Ichinomiya (JP)

( * ) Notice: Subject to any disclaimer, the term of this patent is extended or adjusted under 35 U.S.C. 154(b) by 70 days.

(21) Appl. No.: 10/391,693

(22) Filed: Mar. 19, 2003

(65) Prior Publication Data

US 2003/0198411 A1 Oct. 23, 2003

(30) Foreign Application Priority Data

Apr. 18, 2002 (JP) ........................................ 2002-115795

(51) Int. Cl.[7] .............................................. F16C 29/06
(52) U.S. Cl. .......................................... 384/45; 384/40
(58) Field of Search ............................. 384/45, 40, 43, 384/44, 41

(56) References Cited

U.S. PATENT DOCUMENTS 5,788,306 A * 8/1998 DiBiagio et al. ............. 384/40

FOREIGN PATENT DOCUMENTS

JP                04-102707 A1     4/1992

* cited by examiner

*Primary Examiner*—Lenard Footland
(74) *Attorney, Agent, or Firm*—Darby & Darby

(57) ABSTRACT

A pressure contact piece 5a including a pressure contact plate 6a having an engaging face 7 which can be brought into engagement with one side of a linear guide rail R by rotation of the pressure contact piece 5a, a circular boss 8 formed on a lower surface of the pressure contact plate 6a, a screw insertion hole 12 formed along the central axis of the circular boss 8, and a counterbore 11 formed coaxially with the screw insertion hole; and a fitting hole 30 formed in an installation surface f and including a circular boss hole 31 in which the circular boss 8 of the pressure contact piece 5a is snugly fitted and a female threaded hole 32 which is formed coaxially with the circular boss hole and into which a fitting screw 50 is threaded. The pressure contact piece 5a is rotated with a tool to bring the engaging face 7 into engagement with one side of the linear guide rail R, and the fitting screw 50 is inserted into the fitting hole 32 of the fitting hole 30 and tightened to secure the linear guide rail R.

10 Claims, 19 Drawing Sheets

Fig. 4
(a)
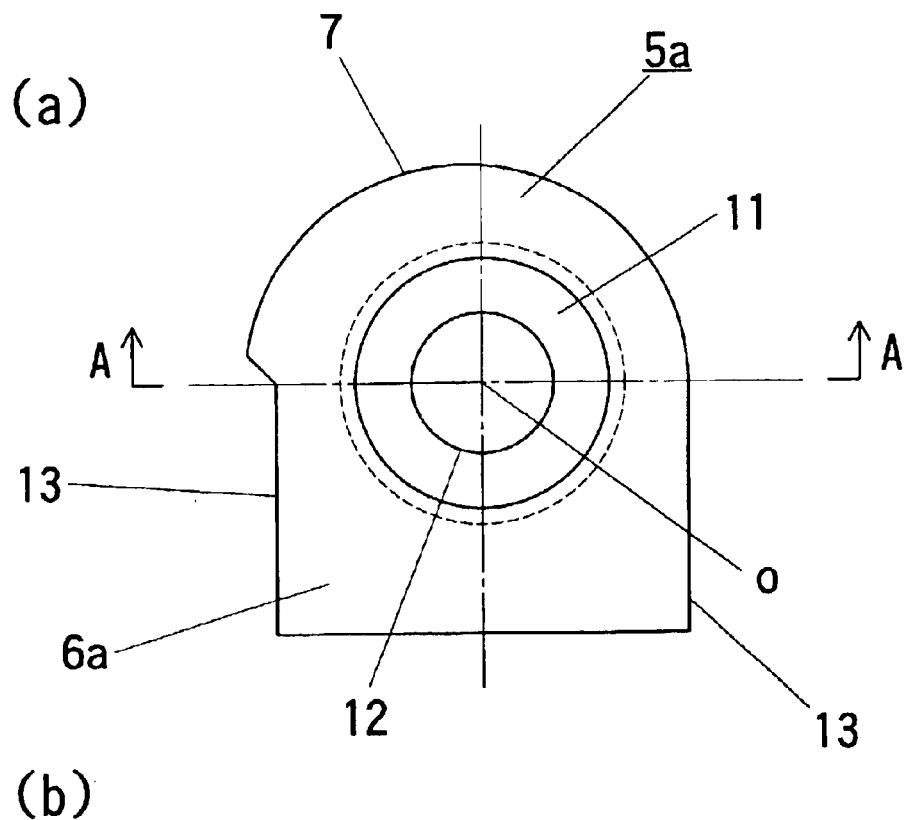
(b)
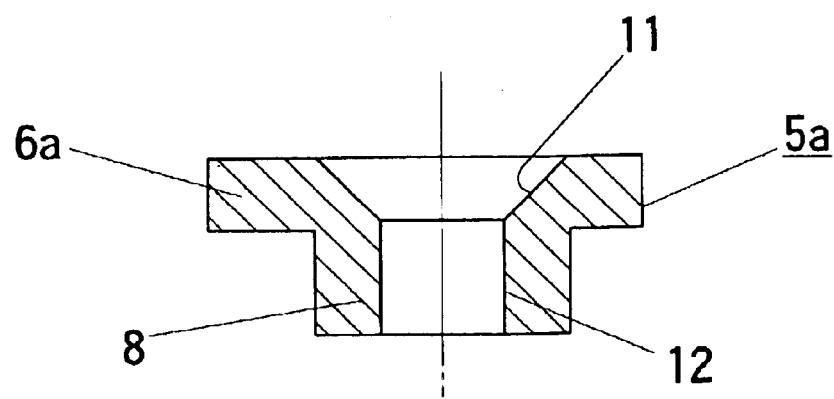

Fig.6
(a)
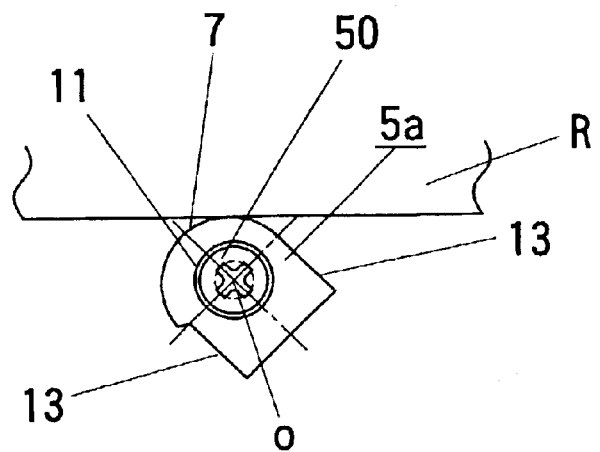
(b)
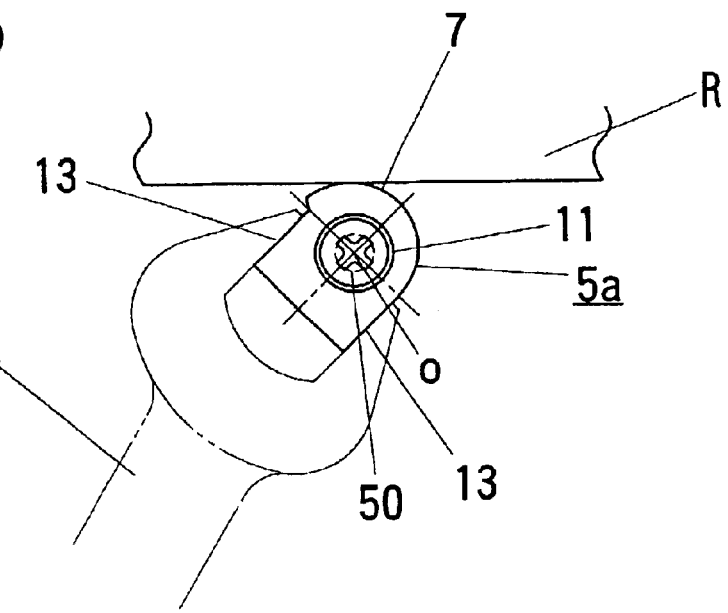

Fig.7
(a)
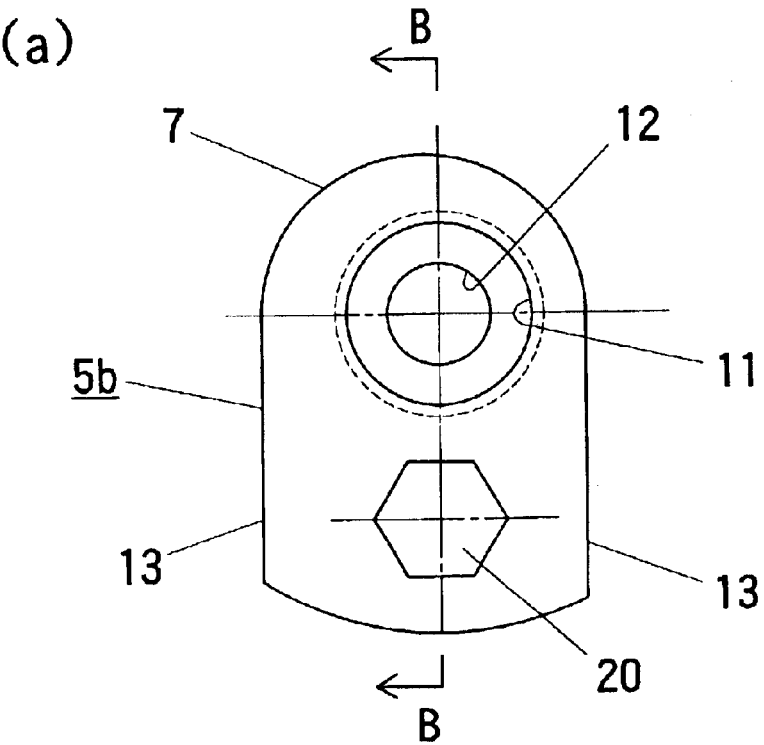
(b)
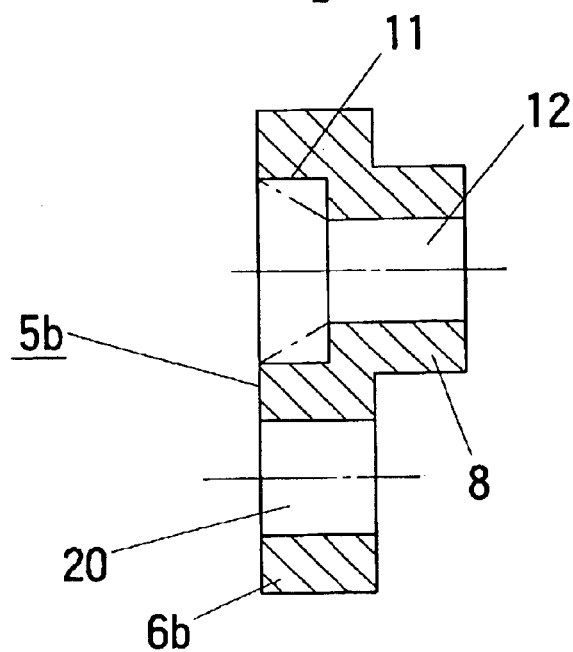

Fig.9
(a)
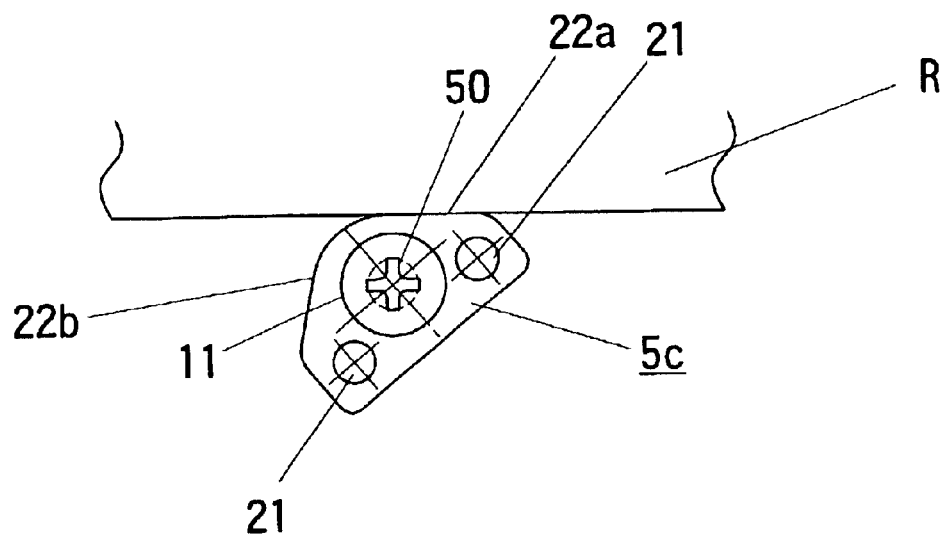
(b)
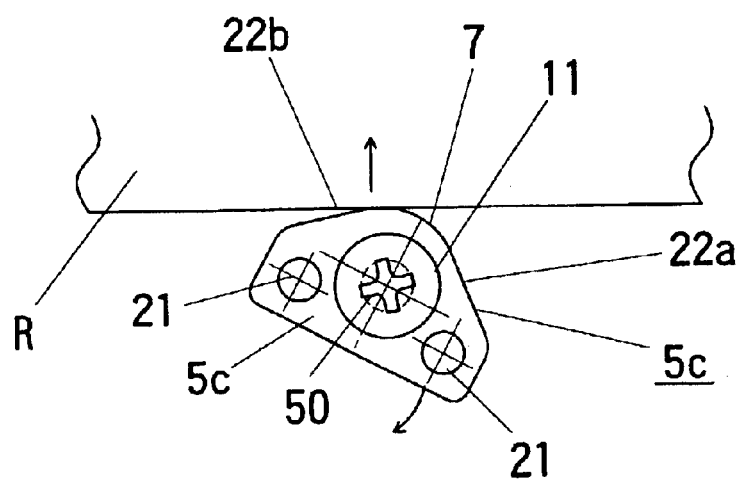

Fig.10
(a)
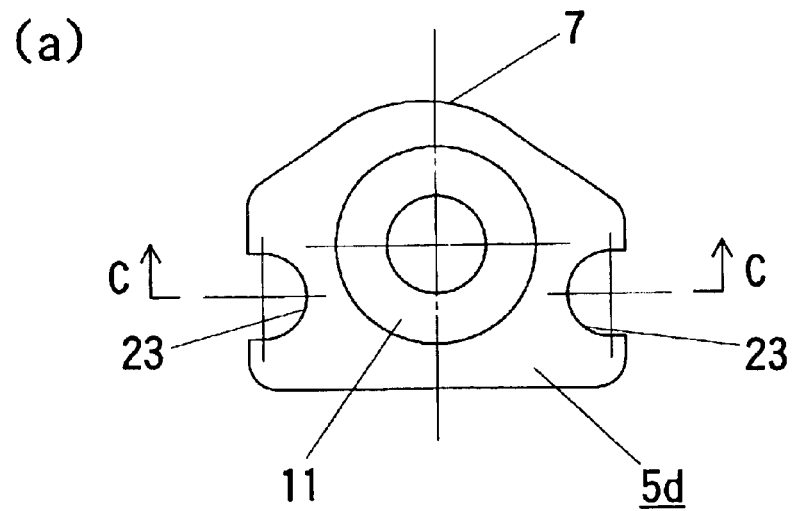
(b)
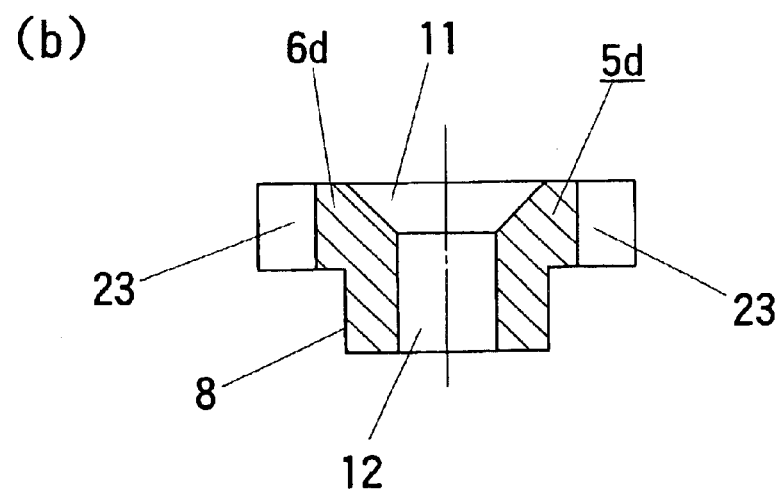

Fig.12
(a)
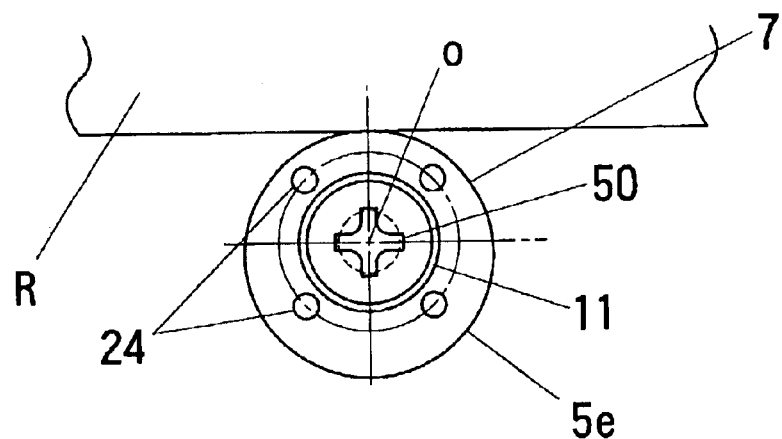
(b)
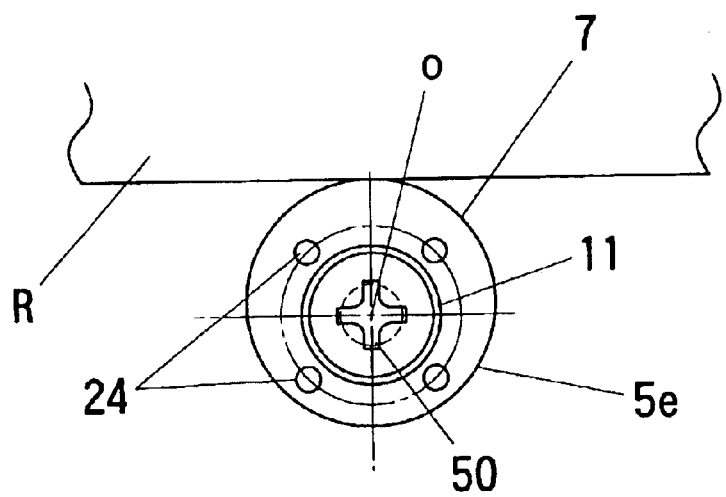

Fig.16
(a)
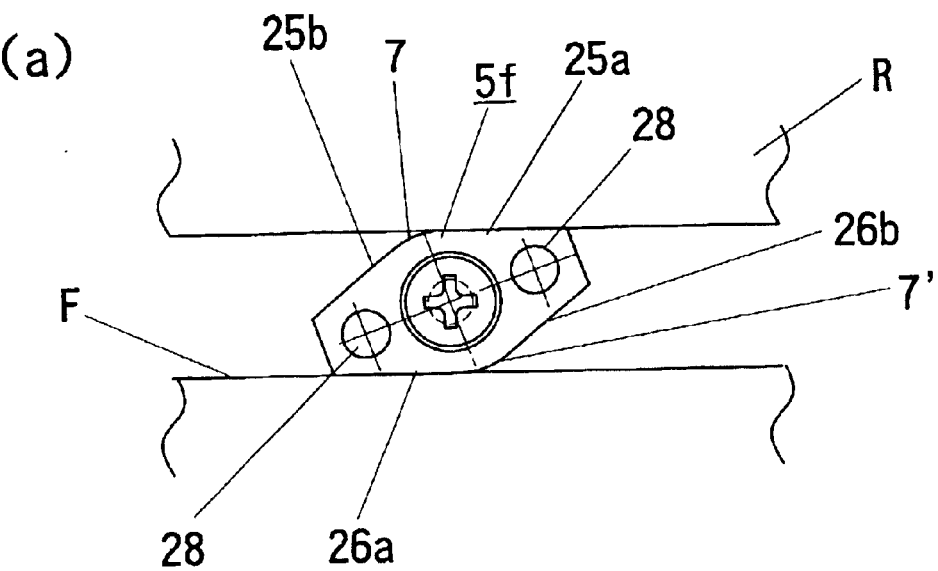
(b)
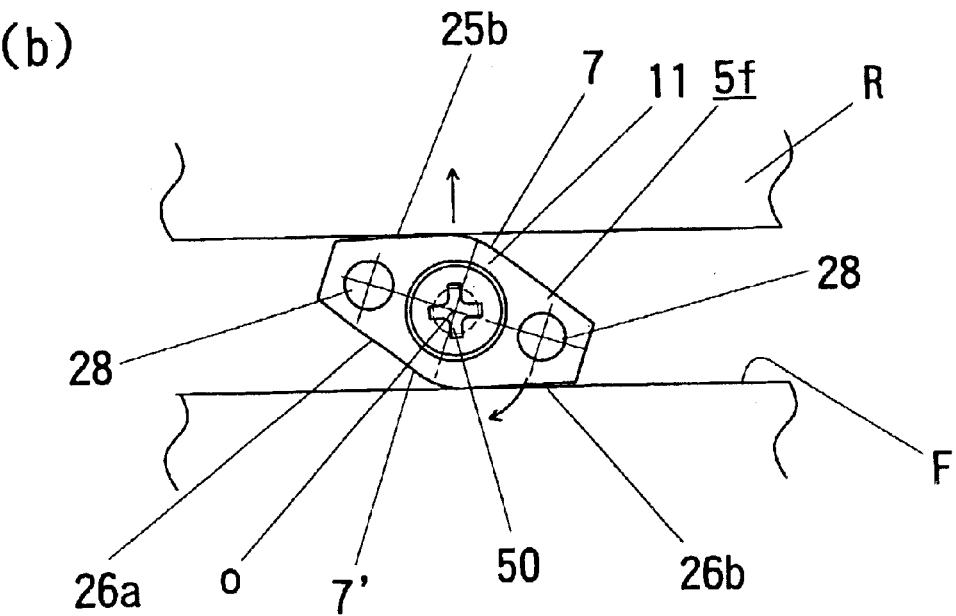

LINEAR GUIDE RAIL HOLDING DEVICE

BACKGROUND OF THE INVENTION

This invention relates to a holding device for a linear guide rail applied to a machining center or a lathe for slidably guiding a machine tool or the like in the longitudinal direction thereof.

A linear guide rail R for slidably guiding a machine or the like in the longitudinal direction thereof as shown in FIG. 19 is widely used as a machine element. When the linear guide R is installed, it is positioned in contact with a vertical reference face L extending vertically from an installation surface f, and a plurality of bolts j are threaded into corresponding threaded holes i formed in the installation surface f through holes h formed through the guide rail R at specified intervals and having a large diameter.

In such a configuration, however, even if the vertical reference face L has an even and uniform surface, the guide rail R may not snugly fit against the reference face L for the following reasons:

(1) Inherent distortion of the linear guide rail R from linearity.
(2) Design tolerance of the threaded holes i
(3) Deformation of the bolts j during tightening.
(4) Deviation between the positions of the holes h and their corresponding threaded holes i.

This results in low accuracy of positioning of the linear guide rail R and causes distortion in movement of the machine mounted thereon. Especially, in the case of a machine tool for precision machining, the low positioning accuracy of the linear guide rail R may lower the yield of the products and cause many other drawbacks.

In addition, the holes h must be formed through the linear guide rail R with high accuracy at positions coincident with their corresponding threaded holes i, and such machining of the holes h takes time and effort. Also the replacement or modification of the linear guide rail R cannot be made quickly because of the machining process. Furthermore, in fixing the linear guide rail R, the holes h are aligned with the corresponding threaded holes i and the bolts j are sequentially threaded into the corresponding threaded holes i from above. This also takes time and effort.

In order to overcome the above drawbacks, the use of pressing means has been proposed. The pressing means comprises a screw receiving projection k (see FIG. 19) formed in parallel to the vertical reference face L on the installation surface f of the base and having a plurality of threaded holes formed therethrough in a direction perpendicular to the longitudinal direction thereof, and a plurality of fixing bolts. When the fixing bolts are threaded through the threaded holes, the forward ends of the fixing bolts press the linear guide rail R against the vertical reference face L and straighten it. In this configuration, however, the screw receiving projection k must be formed on the base, which requires special processing work. Also, the fixing bolts must be threaded in parallel to the horizontal surface of the base. In some cases, it is impossible because of the presence of other machine elements or other reasons. Thus, the means is not necessarily suitable for practical use.

As means to solve the problems, a holding device for positioning is proposed in Japanese Patent No. 2709416. The holding device comprises an eccentric pressure contact plate engageable with one side of a linear guide rail to press the other side thereof against a vertical reference face L, a revolving shaft part which has a tool hole, a vertical slot and a female thread with a pressure surface edge on its bottom end along its central axis and which can be snugly fitted in an insertion hole formed in an installation surface of a base, and a pressure screw having an operating groove in one end for pressing the pressure surface edge of the revolving shaft part downward to extend the slit portion of the revolving shaft part outward when it is threaded downward.

In this configuration, the revolving shaft part is fitted in the insertion hole, and a tool such as a hexagonal wrench is inserted in the tool hole in the top of the eccentric pressure contact plate and rotated to rotate the eccentric pressure contact plate. Then, the distance from the revolving shaft part to a position where the pressure contact plate meets the linear guide rail is varied since the pressure contact plate has an eccentric shape. Thereby, the peripheral face of the eccentric pressure contact plate is pressed against a side of the linear guide rail.

The above configuration has the following problems.

1) The slit portion of the revolving shaft part is extended outward and brought into pressure contact with the internal face of the insertion hole, whereby the eccentric pressure contact plate is secured. Thus, when a force which is larger than the pressing force is applied to the pressure contact plate, the center of the revolving shaft part is shifted, and the linear guide rail cannot be sufficiently held.
2) The female thread is formed below the tool hole in the revolving shaft part. Thus, after a tool has been inserted into the tool hole and the eccentric pressure contact plate has been rotated to a pressure contact position, the tool must be removed and a screw driver must be inserted through the tool hole into the operating groove formed in the top of the pressure screw to rotate the pressure screw. The eccentric pressure contact plate is likely to be rotated in reverse by a reaction force when the tool is removed. When the eccentric pressure contact plate is rotated in reverse, the pressing operation must be performed once again.
3) The slot, the tool hole and the female thread must be formed in the revolving shaft part in succession, and the operating groove must be formed in the top of the pressure screw. It takes time and effort to produce the parts.

SUMMARY OF THE INVENTION

The present invention has been made to solve the above problems and it is, therefore, an object of the present invention to provide a holding device suitable for positioning a linear guide rail.

In accordance with one aspect of the present invention, there is provided a linear guide rail holding device for holding a linear guide rail along a linearly extending vertical reference face formed on an installation surface, said linear guide rail having a first side and a second side opposite to said first side, said holding device comprising:

a pressure contact plate rotatable about a rotational axis thereof and having a lower surface engageable with said installation surface, an upper surface, and a peripheral side surface formed between said lower and upper surfaces, said peripheral side surface having an engaging face pressingly engageable with said first side of said linear guide rail to press said second side thereof against said vertical reference face, said pressure contact plate being shaped such that the distance from said rotational axis to said engaging face gradually increases in a circumferential direction of said engaging face, a circular boss formed on said lower surface of said pressure contact plate and having a central axis coinciding with said rotational axis, a screw insertion hole formed along the central axis of said circular boss, and a screw insertible through said screw insertion hole, said installation surface having a fitting hole including a circular boss hole into which said circular boss is fittingly eangageable and a female thread hole which is formed coaxially with said circular boss hole and with which said screw is threadedly engageable.

In the above configuration, the circular boss of the pressure contact plate is fitted in the circular boss hole formed in the installation surface, and the pressure contact plate is rotated in the direction to increase the distance from the center of the circular boss to the point where the engaging face meets the linear guide rail. Thereby, the engaging face is brought into pressure engagement with the first side of the linear guide rail to press the second side of the linear guide rail against the reference face. Then, the fitting screw is inserted into the screw insertion hole through the counterbore and tightened with a screwdriver to bring the head of the screw into pressure contact with the bottom of the counterbore. Thereby, the pressure contact plate is fixedly secured by the screw to the installation surface with the engaging face in engagement with the first side of the linear guide rail. In this state, a reaction force is constantly applied to the pressure contact plate. However, since the circular boss is snugly fitted in the circular boss hole and supports the reaction force, the load applied to the screw is low and the screw is prevented from being deformed. Thus, the linear guide rail can be held straight along the reference face.

In another aspect, the present invention provides a linear guide rail holding device for holding a linear guide rail along a linearly extending vertical reference face formed on an installation surface, said linear guide rail having a first side and a second side opposite to said first side, wherein said installation surface is provided with an abutting face extending in parallel with said reference face to define therebetween a space in which said linear guide rail is positionable, said holding device comprising:

a pressure contact piece rotatable about a rotational axis thereof and having a lower surface engageable with said installation surface, an upper surface, and a peripheral side surface formed between said lower and upper surfaces, said peripheral side surface having a first engaging face and a second engaging face opposite to said first engaging face with respect to said rotational axis such that said first and second engaging faces are pressingly engageable with said first side of said linear guide rail and said abutting face, respectively, to press said second side of said linear guide rail against said vertical reference face, said pressure contact piece being shaped such that the distance from said rotational axis to at least one of said first and second engaging faces gradually increases in a circumferential direction thereof, a screw insertion hole formed in said pressure contact piece and coinciding with said rotational axis, and a screw insertible through said screw insertion hole, said installation surface having a female threaded hole between said vertical reference face and said abutting face with which said screw is threadedly engageable.

In the above configuration, a reaction force is not supported by a circular boss as in the case of the invention of the first aspect of the present invention but by the abutting face in engagement with the second engaging face of the pressure contact piece. Thereby, the linear guide rail is held in pressure contact with the vertical reference face.

BRIEF DESCRIPTION OF THE DRAWINGS

Other objects, features and advantages of the present invention will become apparent from the detailed description of the preferred embodiments of the invention which follows, when considered in the light of the accompanying drawings, in which:

FIG. 4(a) is a plan view of the pressure contact piece 5a;

FIG. 4(b) is a cross-sectional view taken along the line A—A in FIG. 4(a);

FIG. 6(a) illustrates the operation of the pressure contact piece 5a in a non-pressure contact position thereof;

FIG. 6(b) illustrates the operation of the pressure contact piece 5a in a pressure contact position thereof;

FIG. 7(a) is a plan view of the pressure contact piece 5b;

FIG. 7(b) is a cross-sectional view taken along the line B—B in FIG. 7(a);

FIG. 9(a) illustrates the operation of the pressure contact piece 5c in a non-pressure contact position thereof;

FIG. 9(b) illustrates the operation of the pressure contact piece 5c in a pressure contact position thereof;

FIG. 10(a) is a plan view of the pressure contact piece 5d;

FIG. 10(b) is a cross-sectional view taken along the line C—C in FIG. 10(a);

FIG. 12(a) illustrates the operation of the pressure contact piece 5e in a non-pressure contact position thereof;

FIG. 12(b) illustrates the operation of the pressure contact piece 5e in a pressure contact position thereof;

FIG. 16(a) illustrates the operation of the pressure contact piece 5f in a non-pressure contact position thereof;

FIG. 16(b) illustrates the operation of the pressure contact piece 5f in a pressure contact position thereof;

FIG. 18(*b*) is a side view of the tool z; and

DETAILED DESCRIPTION OF THE PREFERRED EMBODIMENTS OF THE INVENTION

Description will be hereinafter made of the embodiments of the present invention with reference to accompanying drawings.

Figure 1:
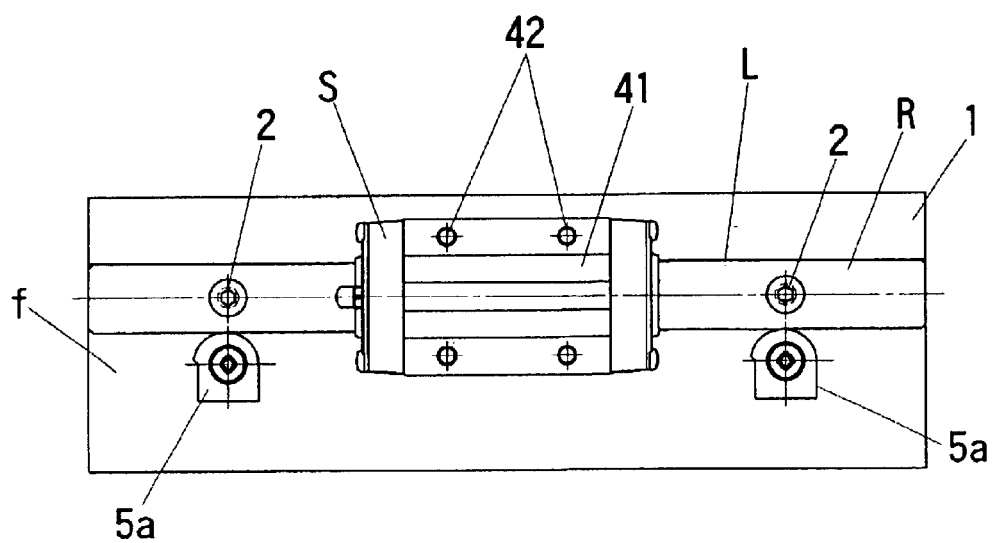
FIG. 1 is a plan view of a base to which pressure contact pieces 5a of the present invention are attached.
Figure 2:
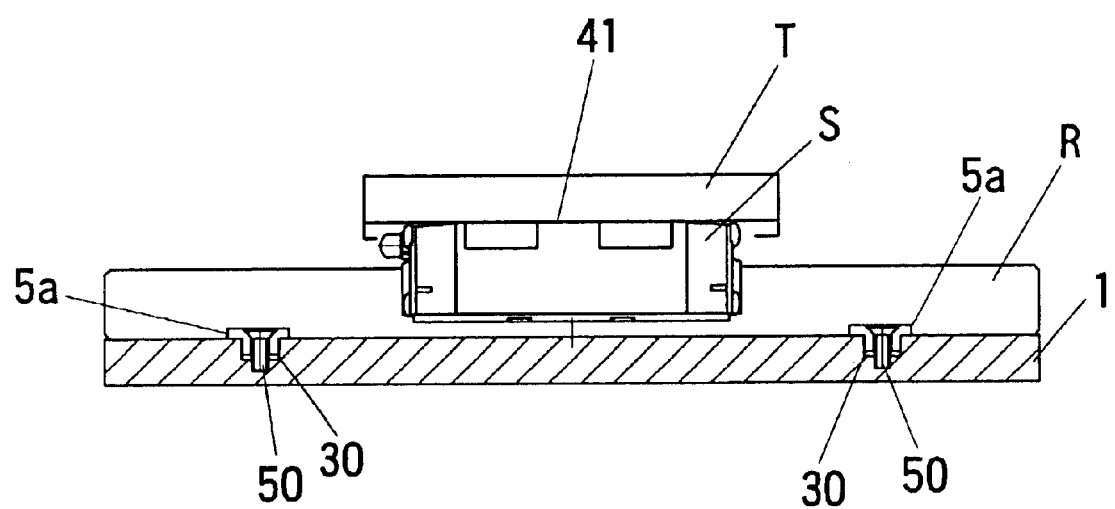
FIG. 2 is a vertical cross-sectional side view of the base to which the pressure contact pieces 5a of the present invention are attached.
Figure 3:
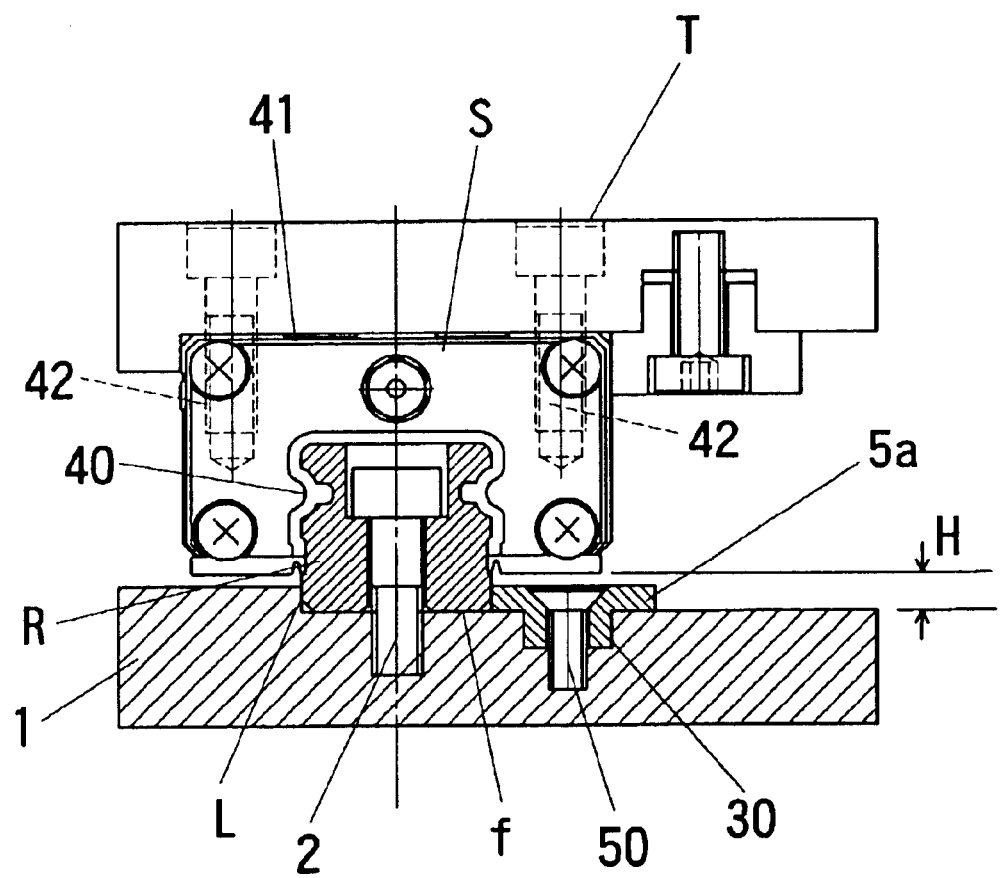
FIG. 3; is a vertical cross-sectional front view of the base to which the pressure contact pieces 5a of the present invention are attached.
Figure 5:
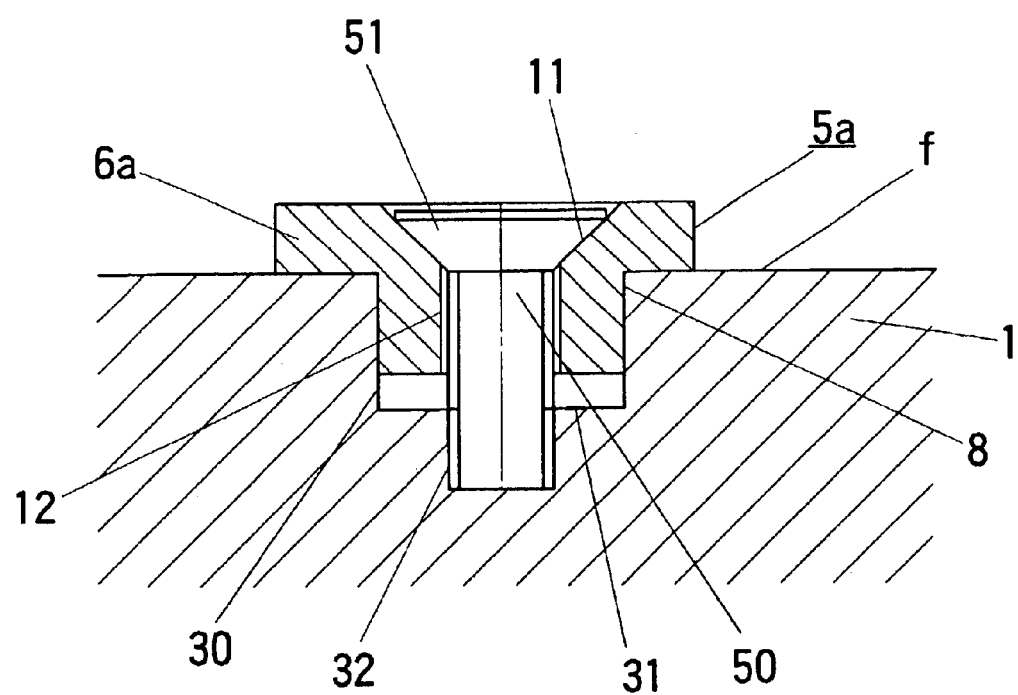
FIG. 5 is a vertical cross-sectional side view illustrating the state of the pressure contact piece 5a attached to the base.

As shown in FIG. 1 to FIG. 3, a vertical reference face L vertically extends from a base 1 and a linear guide rail R is in contact along the vertical reference face L. A linear slider S for mounting a machine tool T or the like thereon is mounted on the linear guide rail R for linear sliding movement along the linear guide rail R. The linear slider S has a fitting groove 40 shaped to match the cross-sectional shape of the linear guide rail R and a mounting face 41 for mounting the machine tool T thereon. Fitting screw holes 42 for fixing the machine tool T are formed vertically in the mounting face 41 along opposite edges thereof (see FIG. 3).

Although the linear guide rail R is secured by securing bolts 2, it can be slightly moved with respect to the securing bolts 2. After loosening the securing bolts 2, the linear guide rail R is pressed against the vertical reference face L by the holding device of the present invention. Then, the securing bolts 2 are tightened to secure the linear guide rail R. By being pressed against the vertical reference face, the linear guide rail R is straightened in 0.01 mm increments. Thus, the linear slider S mounted on the guide rail R can be linearly slid smoothly.

The holding device of the present invention includes pressure contact pieces 5*a* to 5*f*. Description will be hereinafter made of each embodiment.

As described by FIG. 1 to FIG. 3, the base 1 has the vertical reference face L for keeping the linear guide rail R straight, and a plurality of pressure contact pieces 5*a* are provided along one side of the linear guide rail R. The hereinafter described pressure contact pieces 5*b* to 5*e* can be applied to the configuration shown in FIG. 1 to FIG. 3.

As shown in FIG. 4, the pressure contact piece 5*a* comprises a pressure contact plate 6*a* having an engaging face 7 engageable with one side of the linear guide rail R to press the other side of the linear guide rail R against the vertical reference face L, and a circular boss 8 formed on a lower surface of the pressure contact plate 6*a*. The pressure contact plate 6*a* is shaped such that the distance from the center o of the circular boss 8 to the engaging face 7 gradually increases in the counterclockwise direction. Thus, the pressure contact piece 5*a* is rotated in the clockwise direction (the rotational direction of a fitting screw 50), the distance from the center o of the circular boss 8 to the point where the engaging face 7 meets the linear guide rail R increases.

The fitting screw 50 has a countersunk head 51. The pressure contact piece 5*a* has a screw insertion hole 12 formed along the central axis of the circular boss 8, and a conically tapered counterbore 11 formed coaxially with the screw insertion hole 12 for receiving the countersunk head 51 of the fitting screw 50. Since the fitting screw 50 is a countersunk head screw, the height of the counterbore 11 can be made low, and the pressure contact plate 6*a* can be made thin. Namely, since the counterbore 11 is conically tapered downward, a lower part of the counterbore 11 can be formed in the circular boss 8. Thus, the counterbore 11 can be formed even when the pressure contact plate 6*a* is as thin as about 1 mm.

In some cases, the distance H between the linear slider S and the base 1 (see FIG. 3) is about 5 mm or less. Thus, the pressure contact plate 6*a* of the pressure contact piece 5*a* is preferably as thin as possible. Thus, the fitting screw 50 is not protruded from the pressure contact plate 6*a* and the fitting screw 50 having a countersunk head and the conically tapered counterbore 11 are adopted to make the pressure contact plate 6*a* thin. Even when the pressure contact plate 6*a* has a thickness of about 1 mm (it can be thinned to 0.7 mm), the holding strength can be secured by the circular boss 8 as described later.

The pressure contact plate 6*a* of the pressure contact piece 5*a* also has a pair of tool engaging faces 13 and 13 formed in parallel to each other and shaped to fit a wrench x as well as the engaging face 7.

A plurality of fitting holes 30 are formed at specified intervals in the installation surface f of the base 1 for the pressure contact pieces 5*a* to 5*e*. Each of the fitting holes 30 comprises a circular boss hole 31 having an inside diameter to snugly fit the circular boss 8, and a female threaded hole 32 which is formed coaxially with the circular boss hole 31 and into which the fitting screw 50 is threaded.

In the above configuration, the securing bolts 2 for securing the linear guide rail R are loosened and the circular boss 8 of the pressure contact piece 5*a* is inserted into the circular boss hole 31 of the fitting hole 30. Then, the fitting screw 50 is loosely threaded into the female threaded hole 32 through the screw insertion hole 12. At this time, the pressure contact piece 5*a* is positioned in a non-pressure contact position where the distance from the center o of the circular boss 8 to the point where the engaging face 7 meets the liner guide rail R is smallest as shown in FIG. 6(*a*). The wrench x is then fitted to the tool engaging faces 13 and 13 and rotated in the clockwise direction to bring the pressure contact piece 5*a* into a pressure contact position shown in FIG. 6(*b*). Then, the fitting screw 50 is tightened with the pressure contact piece 5*a* held with the wrench x. Since the tightening direction of the fitting screw 50 is clockwise, namely, in a direction to increase the distance from the center o of the circular boss 8 to the point where the engaging face 7 meets the liner guide rail R, the pressure of the pressure contact piece 5*a* against the linear guide rail R is not decreased by the rotation of the fitting screw 50.

In the above configuration, when the wrench x is fitted to the tool engaging faces 13 and 13, there is nothing to interfere with the threading of the fitting screw 50 above the counterbore 11, so that the fitting screw 50 can be tightened with the pressure contact piece 5*a* held with the wrench x. Thus, in contrast to a conventional configuration in which a fitting screw is threaded after removing a press fitting tool, the pressure contact piece 5*a* is not rotated in reverse by a reaction force.

Also, although a reaction force is constantly applied to the pressure contact piece 5*a* after the securing of the linear guide rail R, no load is applied to the fitting screw 50 since the circular boss 8 is snugly fitted in the circular boss hole 31.

The pressure contact pieces 5*b* to 5*e* are also configured to be fitted in the fitting holes 30 formed in the base 1, and the configurations thereof will be hereinafter described.

FIG. 7 shows the pressure contact piece 5*b*. The pressure contact piece 5*b* has a pressure contact plate 6*b* having a hexagon socket 20 in addition to the engaging faces 13 and 13 shaped to fit a wrench x. Thus, the pressure contact piece 5b can be rotated with a hexagonal wrench. Even when a hexagonal wrench is fitted in the hexagon socket 20, there is nothing to interfere with threading of the fitting screw 50 above the counterbore 11. Thus, the fitting screw 50 can be tightened with the pressure contact piece 5b held with the hexagonal wrench, and the pressure contact piece 5b is not rotated in reverse by a reaction force. Also in this configuration, the fitting screw 50 may be a countersunk head screw and the counterbore 11 may be conically tapered (see the dot-dash lines in FIG. 7).

Figure 8:
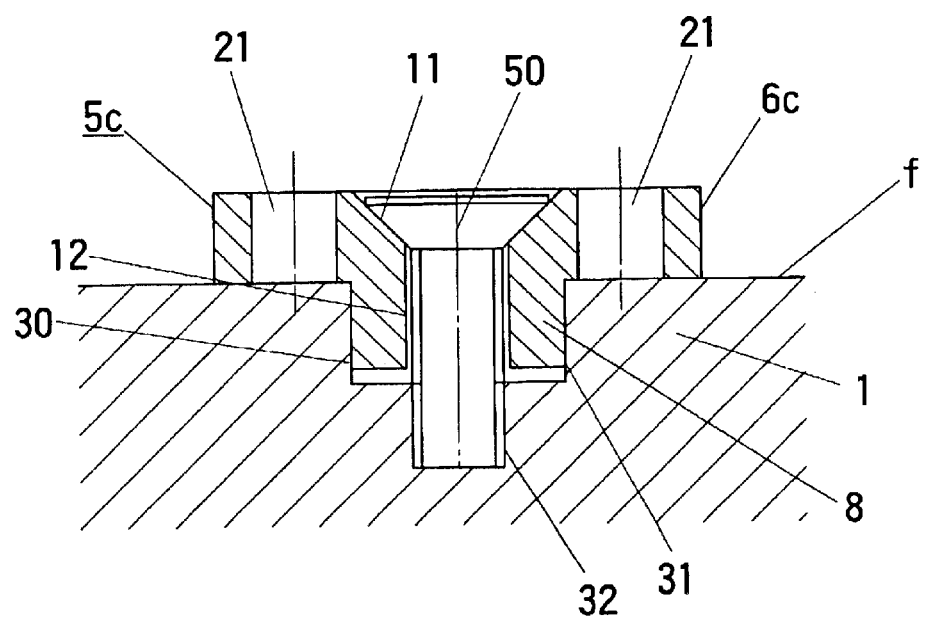
FIG. 8 is a vertical cross-sectional side view illustrating the state of the pressure contact piece 5c attached to the base.

FIG. 8 and FIG. 9 show the pressure contact piece 5c. The pressure contact piece 5c can be rotated with a tool y shown in FIG. 17, and comprises a pressure contact plate 6c having two operating holes 21 and 21 formed in the vicinity of the counterbore 11. The pressure contact plate 6c is of a generally pentagonal shape including sides 22a and 22b, and an engaging face 7 is formed across the sides 22a and 22b. The distance from the center of rotation of the pressure contact piece 5c to the side 22b is larger than that to the side 22a. The counterbore 11 is conically tapered to fit the countersunk head of the fitting screw 50.

The tool y comprises a rotating handle 60 and engaging projections 61 and 61 which can be fitted in the operating holes 21 and 21 formed at an end of the rotating handle 60. The tool y has a concave recess 62 at an end so that the counterbore 11 may not be covered. The engaging projections 61 and 61 are fitted in the operating holes 21 and 21 and the rotating handle 60 is operated to rotate the pressure contact piece 5c in the clockwise direction from a non-pressure contact position shown in FIG. 9(a) where the side 22a extends almost along one side of the linear guide rail R to a pressure contact position shown in FIG. 9(b) where the side 22b is in engagement with the side of the linear guide rail R. Then, the fitting screw 50 is tightened. At this time, since there is nothing to interfere with the threading of the fitting screw 50 above the counterbore 11 because of the concave recess 62, the fitting screw 50 can be tightened with the pressing piece 5c held in the pressure contact position with the tool y. Thus, the pressure contact piece 5c is not rotated in reverse by a reaction force. Since the fitting screw 50 has a countersunk head, the height of the counterbore 11 can be made low and the pressure contact plate 6c can be made thin.

FIG. 10 shows the pressure contact piece 5d, which comprises a pressure contact plate 6d having semicircular operation recesses 23 and 23 into which the engaging projections 61 and 61 of the tool y can be fitted on both sides thereof. The operation to turn the pressure contact piece 5d is the same as that of the pressure contact piece 5c described by FIG. 9, and the description thereof is omitted.

Figure 11:
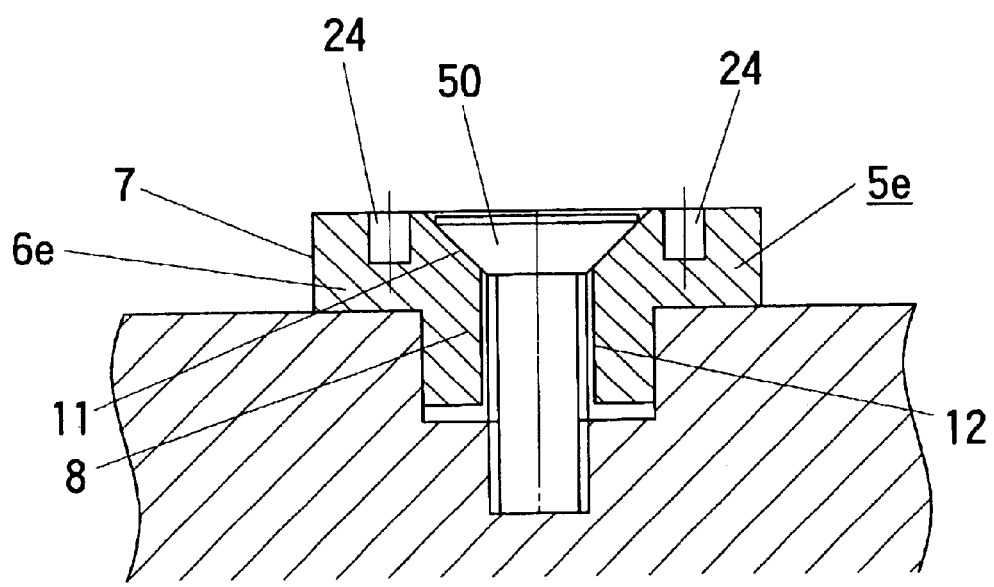
FIG. 11 is a vertical cross-sectional side view illustrating the state of the pressure contact piece 5e attached to the base.
Figure 13:
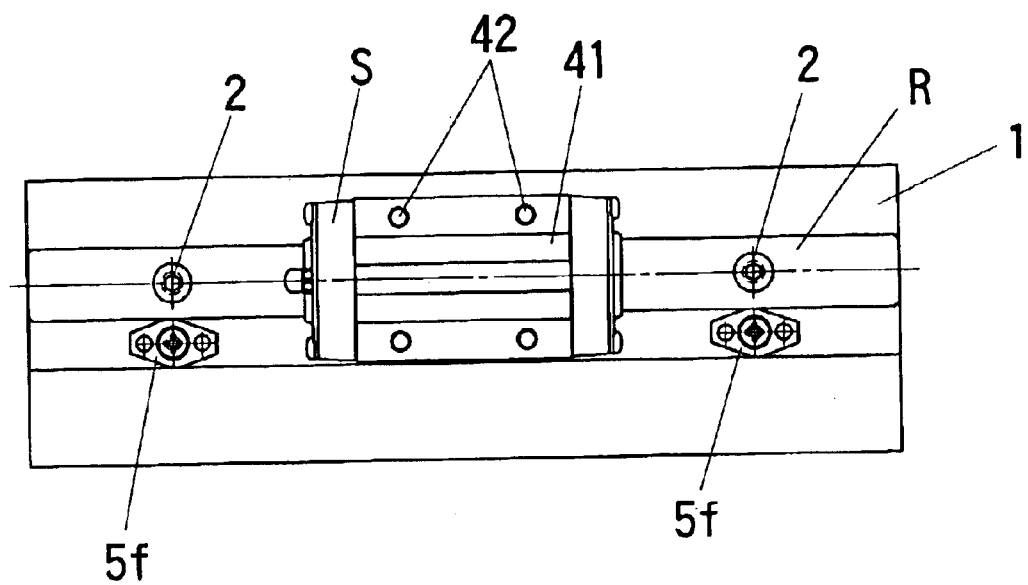
FIG. 13 is a plan view of a base to which pressure contact pieces 5f of the present invention are attached.
Figure 14:
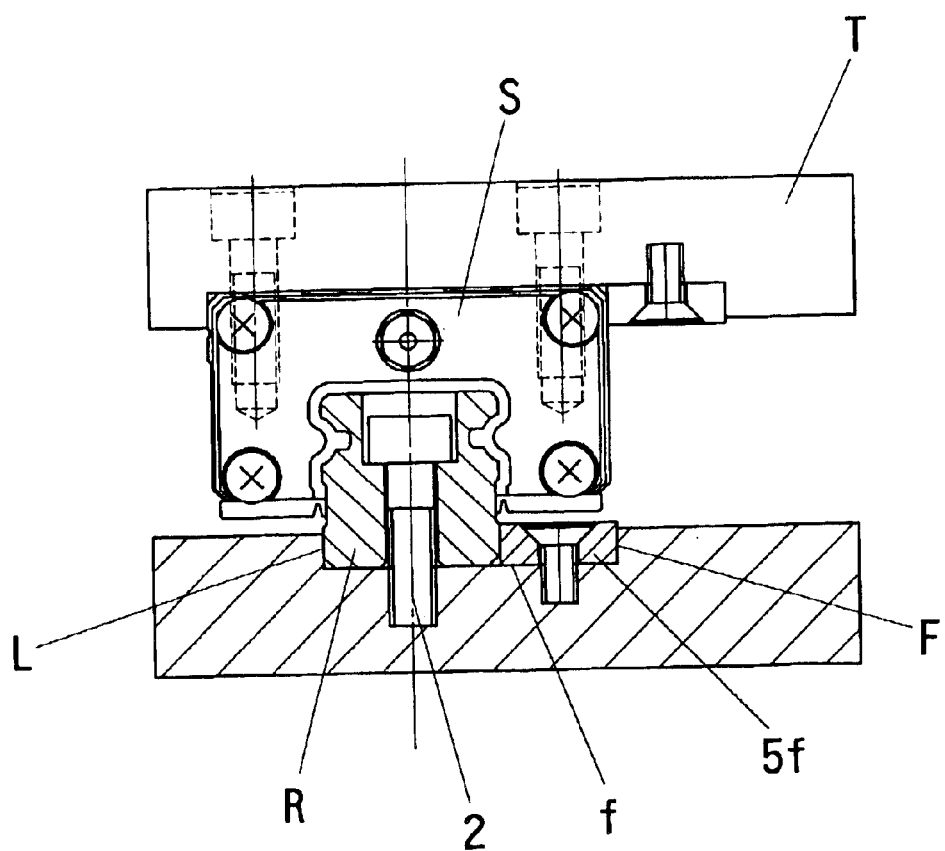
FIG. 14 is a vertical cross-sectional front view of the base to which pressure contact pieces 5f of the present invention are attached.
Figure 18:
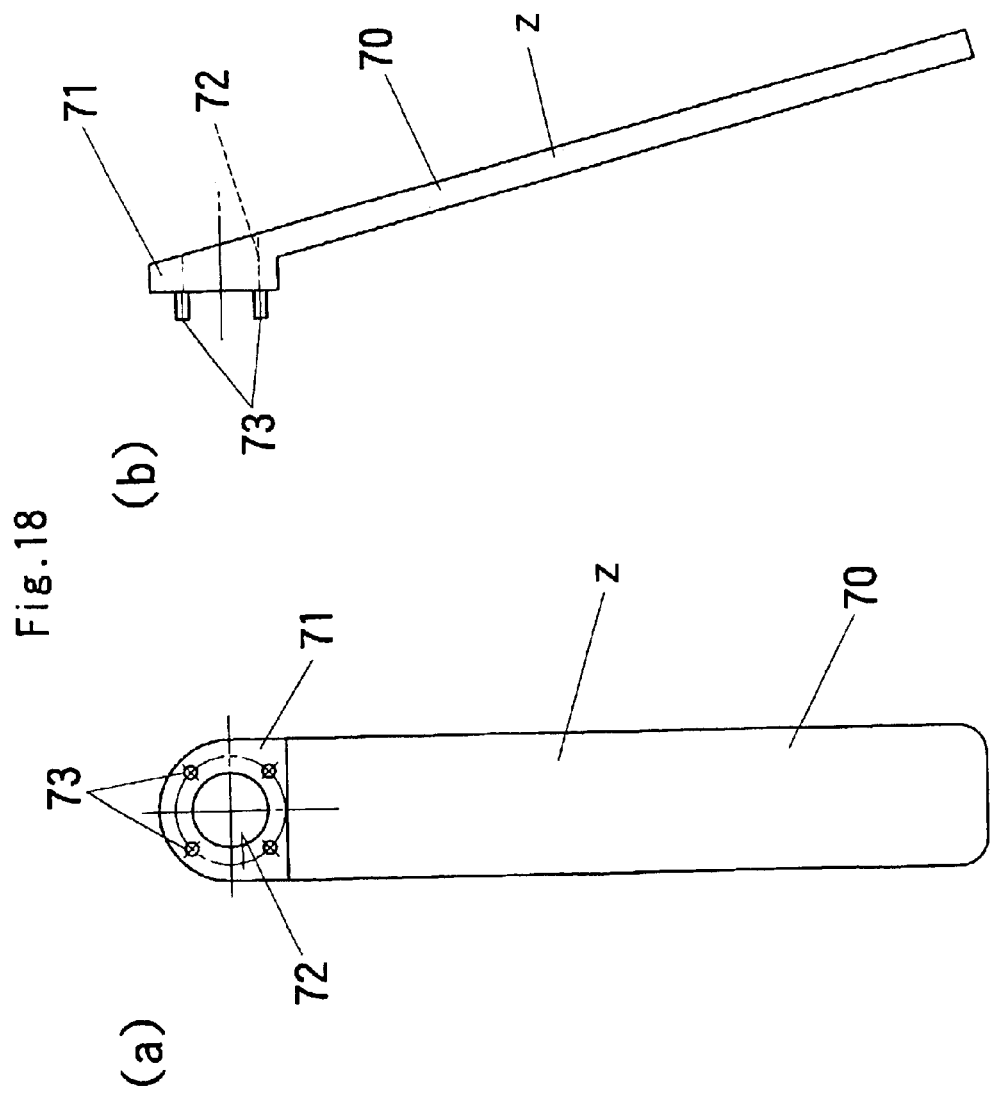
FIG. 18(*a*) is a bottom view of a tool z.
Figure 19:
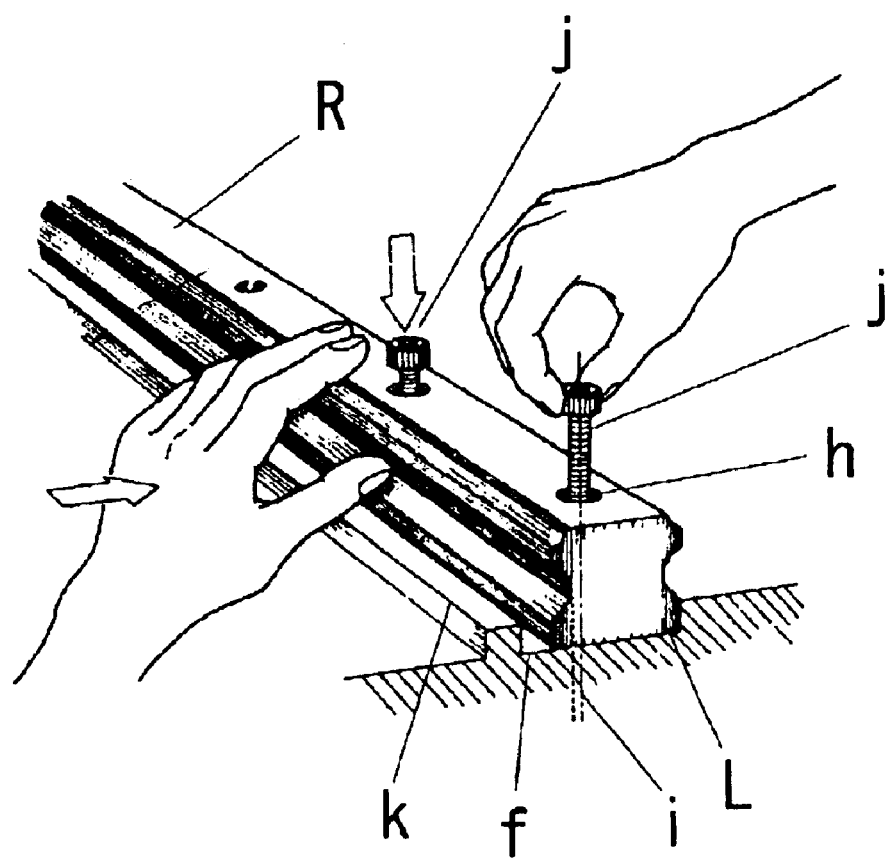
FIG. 19 is a perspective view illustrating conventional means for holding a liner guide rail R.

FIGS. 11 and 12 show the pressure contact piece 5e. The pressure contact piece 5e can be rotated with a tool z shown in FIG. 18, and comprises a pressure contact plate 6e having four operating holes 24 formed around the counterbore 11 at equally spaced angular intervals. The pressure contact plate 6e is of a circular shape whose center is offset from the center of the counterbore 11. Thus, the whole circumference of the pressure contact piece 5e forms an engaging face 7.

The tool z comprises a rotating handle 70 and a connected portion 71. The connected portion 71 has an insertion hole 72 at the center thereof and four engaging projections 73 which can be fitted in the operating holes 24 from above around the insertion hole 72.

The engaging projections 73 are fitted in the operating holes 24 and the rotating handle 70 is operated to rotate the pressure contact piece 5e in the clockwise direction from a non-pressure contact position shown in FIG. 12(a) where the distance from the center of the rotation of the pressure contact piece 5e to the point where the engaging face 7 meets one side of the linear guide rail R is smallest to a pressure contact position shown in FIG. 12(b). Then, the fitting screw 50 is tightened. At this time, since there is nothing to interfere with the threading of the fitting screw 50 above the counterbore 11 because of the insertion hole 72, the fitting screw 50 can be tightened with the pressing piece 5e held in the pressure contact position with the tool z. Thus, the pressure contact piece 5e is not rotated in reverse by a reaction force.

The pressure contact piece 5e can be also rotated with the tool y when the engaging projections 61 and 61 of the tool y are fitted in the two adjacent operating holes 24 and the operating handle 60 is operated.

FIG. 13 to FIG. 16 show an embodiment in which a pressure contact piece 5f is used and an abutting face F vertically extending from the installation surface f of the base 1 is formed in parallel to and at a distance from the vertical reference face L. The pressure contact pieces 5f are attached to the installation surface f between the vertical reference face L and the abutting face F. Screw holes 35 are formed in the installation surface f.

Figure 15:
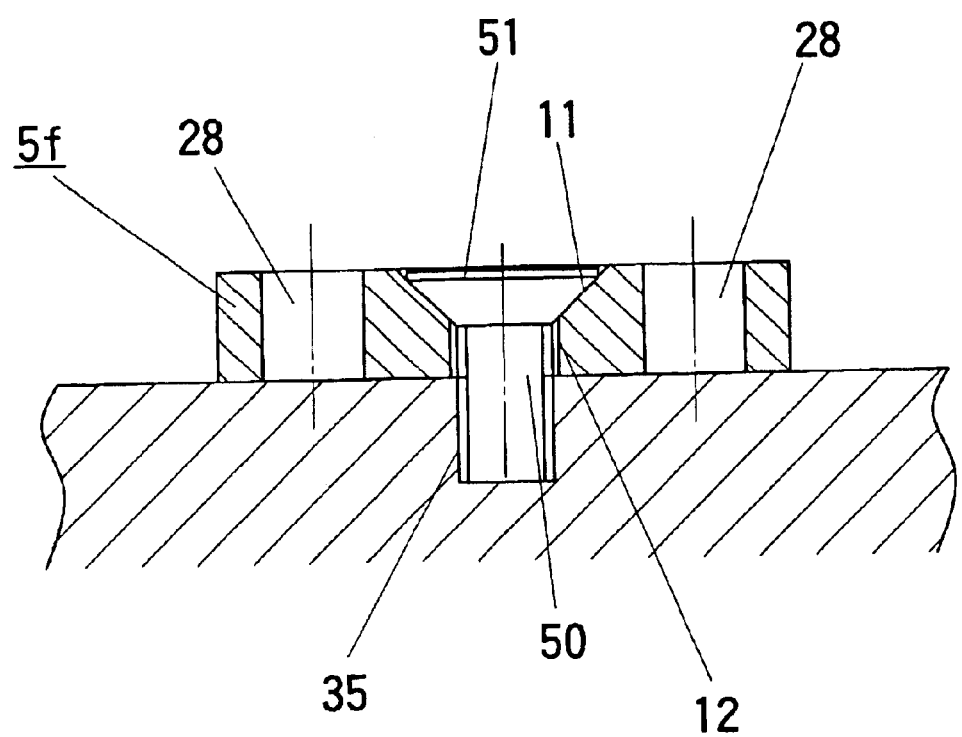
FIG. 15 is a vertical cross-sectional side view illustrating the state of the pressure contact piece 5f attached to the base.

As shown in FIG. 15 and FIG. 16, the pressure contact piece 5f has a first engaging face 7 engageable with one side of the linear guide rail R to press the other side of the linear guide rail R against the vertical reference face L, but does not have the circular boss 8 in contrast to the embodiments described before. The pressure contact piece 5f has a screw insertion hole 12 formed through the center thereof and a conically tapered counterbore 11 formed coaxially with the screw insertion hole 12 for receiving the countersunk head 51 of the fitting screw 50.

The pressure contact piece 5f has no circular boss. Thus, in order to thin the pressure contact piece 5f to about 1 mm (it can be thinned to 0.7 mm), the fitting screw 50 having a countersunk head and the conically tapered counterbore 11 are adopted. The pressure contact piece 5f is of a rhombic shape with sides 25a, 25b, 26a and 26b. The first engaging face 7 is formed across the sides 25a and 25b. The distance from the center of rotation of the pressure contact piece 5f to the side 25b is larger than that to the side 25a. A second engaging face 7' is formed across the sides 26a and 26b. The distance from the center of rotation of the pressure contact piece 5f to the side 26b is larger than that to the side 26a. The first and second engaging faces 7 and 7' are symmetrical with respect to the center of rotation of the pressure contact piece 5f. Thus, as described later, in a non-pressure contact position shown in FIG. 16(a), the sides 25a and 26a extend almost along one side of the linear guide rail R and the abutting face F, respectively, and the pressure contact piece 5f is in engagement with neither the linear guide rail R nor the abutting face F. When the pressure contact piece 5f is rotated in the clockwise direction, it is brought into a pressure contact position shown in FIG. 16(b). In the pressure contact position, the sides 25b and 26b are in engagement with the linear guide rail R and the abutting face F, respectively, and the pressure contact piece 5f presses the linear guide rail R against the reference face L.

Figure 17:
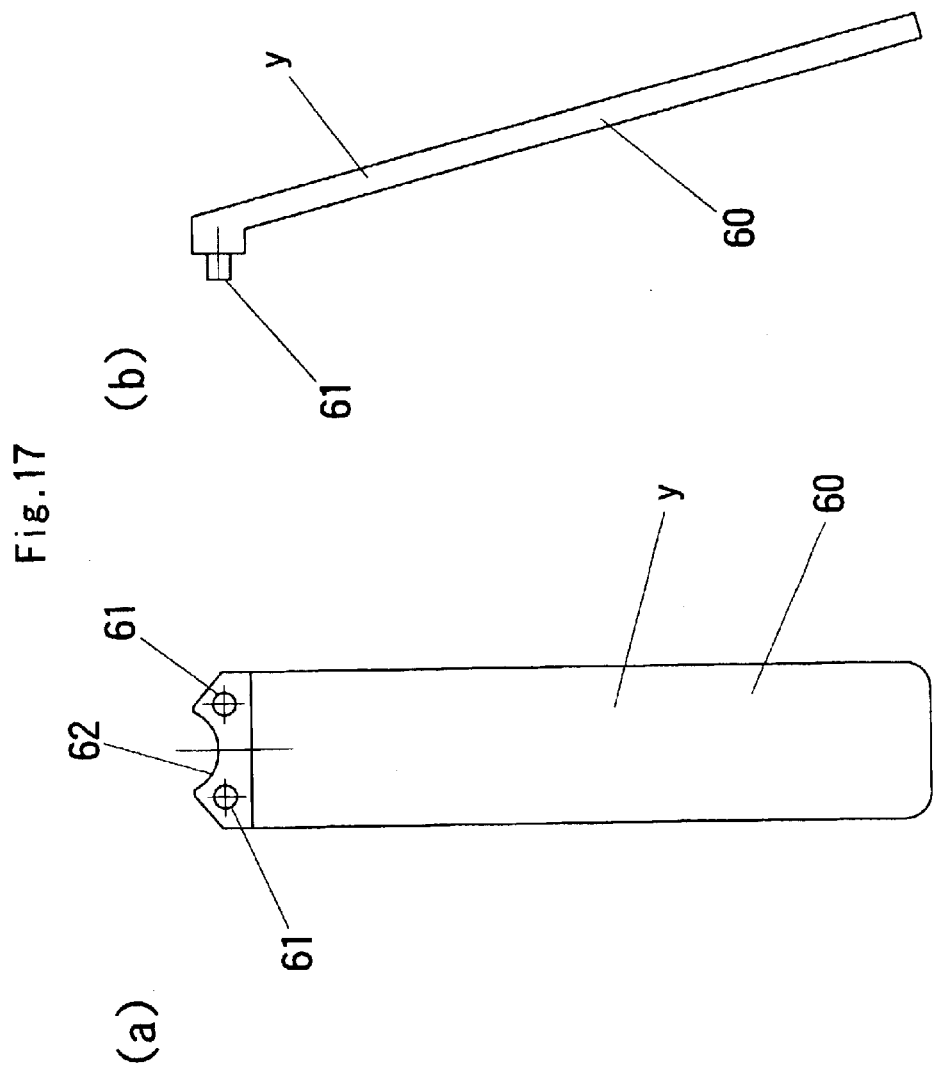
FIG. 17(a) is a bottom view of a tool y.
FIG. 17(b) is a side view of the tool y.

The pressure contact piece 5f had operating holes 28 and 28 formed therethrough on both sides of the counterbore 11 so that the engaging projections 61 and 61 of the tool y shown in FIG. 17 can be fitted therein.

In the above configuration, the securing bolts 2 for securing the linear guide rail R are loosened and the pressure contact piece 5f is placed on the installation surface f such that the screw insertion hole 12 thereof is aligned with the female threaded hole 35 and the sides 25a and 26a extend along the one side of the linear guide rail R and the abutting face F, respectively. Then the engaging projections 61 and 61 of the tool y are fitted in the operating holes 28 and 28 and rotated in the clockwise direction to bring the piece 7 into the pressure contact position shown in FIG. 16(b) where the first and second engaging faces 7 and 7' are in engagement with one side of the linear guide rail R and the abutting face F, respectively. Then, the fitting screw 50 is tightened with the pressure contact piece 5f held with the tool y. At this time, the tightening direction of the fitting screw is clockwise, namely in the direction to increase the distance from the center of rotation of the pressure contact piece 5f to the first and second engaging faces 7 and 7'. Thus, the pressure of the pressure contact piece 5f against the linear guide rail R is not lowered by the rotation of the fitting screw 50.

After the securing of the linear guide rail R, a reaction force is constantly applied to the pressure contact piece 5f. However, since the side 26b of the pressure contact piece 5f is in engagement with the abutting face F, no load is applied to the fitting screw 50.

In the invention of the first aspect, a pressure contact piece comprises a pressure contact plate having an engaging face which can be brought into engagement with one side of a linear guide rail by rotation of the pressure contact piece, a circular boss formed on a lower surface of the pressure contact plate, a screw insertion hole formed along the central axis of the circular boss, and a counterbore formed coaxially with the screw insertion hole for receiving a head of a fitting screw; and a fitting hole formed in an installation surface and comprising a circular boss hole in which the circular boss is snugly fitted and a female threaded hole which is formed coaxially with the circular boss hole and into which a fitting screw is threaded. The pressure contact piece is fitted in the fitting hole and rotated with a tool to bring the engaging face into engagement with one side of the linear guide rail. Then, the fitting screw is inserted through the counterbore into the fitting hole and tightened to secure the linear guide rail. Thus, after the securing of the linear guide rail, a reaction force is constantly applied to the pressure contact piece. However, the circular boss is snugly fitted in the circular boss hole and supports the reaction force, so that the load applied to the fitting screw is low and the fitting screw is prevented from being deformed. Thus, the linear guide rail can be held straight with stability.

In the configuration in which the pressure contact plate of the pressure contact piece has a pair of tool engaging faces formed in parallel to each other and shaped to fit a wrench, the wrench can be fitted to the engaging faces from a side of the pressure contact piece and rotated to bring the pressure contact piece into engagement with one side of the linear guide rail. Thus, the pressure contact piece can be rotated without using a special tool. Also, since the wrench is not placed above the pressure contact piece, the fitting screw can be inserted into the screw insertion hole through the counterbore and tightened with a screwdriver with the pressure contact piece held with the tool. Thus, the pressure contact piece is not rotated in reverse by a reaction force.

In one embodiment of the invention, a pressure contact piece comprises a pressure contact piece having a first engaging face which can be brought into engagement with one side of the linear guide rail by rotation of the pressure contact piece, a second engaging face opposite to the first engaging face, a screw insertion hole formed through the center thereof, and a counterbore formed coaxially with the screw insertion hole; an abutting face vertically extending upward from an installation surface and in parallel to the reference face; and a female threaded hole which is formed in the installation surface between the vertical reference face and the abutting face and into which a fitting screw is threaded, whereby when the first engaging face of the pressure contact piece is brought into engagement with one side of the linear guide rail, the second face thereof is brought into engagement with the abutting face. Since a reaction force is received by the abutting face in engagement with the second engaging face of the pressure contact piece, the load applied to the fitting screw is low and the fitting screw is prevented from being deformed. Thus, the linear guide rail can be held straight with stability.

In the configuration in which the pressure contact piece has a vertical operating hole for a turning tool in the vicinity of the center of rotation thereof, the pressure contact piece can be rotated on a base having an abutting face by using a tool having an engaging protrusion which can be fitted into the operating hole from above.

In the configuration in which a screw having a countersunk head is used as the fitting screw and the pressure contact piece has a screw insertion hole and a conically tapered counterbore formed coaxially with the screw insertion hole for receiving the countersunk head of the fitting screw, the pressure contact plate can be made thin. Thus, the linear guide rail holding device of the present invention can be used in a machine in which the distance H between the linear slider and the base (see FIG. 3) is small.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2002-115795, filed Apr. 18, 2002, inclusive of the specification, claims and drawings, are hereby incorporated by reference herein.

What is claimed is:

1. A linear guide rail holding device for holding a linear guide rail along a linearly extending vertical reference face formed on an installation surface, said linear guide rail having a first side and a second side opposite said first side, said holding device comprising:

a pressure contact plate rotatable about a rotational axis thereof and having a lower surface engageable with said installation surface, an upper surface, and a peripheral side surface formed between said lower and upper surfaces, said peripheral side surface having an engaging face pressingly engageable with said first side of said linear guide rail to press said second side thereof against said vertical reference face, said pressure contact plate being shaped such that the distance from said rotational axis to said engaging face gradually increases in a circumferential direction of said engaging face, a circular boss formed on said lower surface of said pressure contact plate and having a central axis coinciding with said rotational axis, a screw insertion hole formed along the central axis of said circular boss, and a screw insertible through said screw insertion hole, said installation surface having a fitting hole including a circular boss hole into which said circular boss is fittingly eangageable and a female thread hole which is formed coaxially with said circular boss hole and with which said screw is threadedly engageable.

2. A linear guide rail holding device as claimed in claim 1, wherein said pressure contact plate is additionally provided with a pair of tool engaging faces formed in parallel to each other and shaped to fit a wrench so that said pressure contact plate is rotated by operation of said wrench grasping said tool engaging faces.

3. A linear guide rail holding device as claimed in claim 1, further comprising a tool having an operating member having a polygonal shape, wherein said upper surface of said pressure contact plate is provided with a polygonal insertion hole into which said operating member is fittingly engageable, so that said pressure contact plate is rotated by operation of said tool with said operating member being in fitting engagement with said insertion hole.

4. A linear guide rail holding device as claimed in claim 1, further comprising a tool having at least two operating members, wherein said upper surface of said pressure contact plate is additionally provided with at least two insertion holes corresponding in number to the number of said operating members and arranged along a circle coaxial with said rotational axis such that respective operating members are fittingly engageable with the corresponding insertion holes, so that said pressure contact plate is rotated by operation of said tool with said operating members being in fitting engagement with said insertion holes.

5. A linear guide rail holding device as claimed in claim 1, further comprising a counterbore formed coaxially with said screw insertion hole and having a diameter larger than that of said screw insertion hole for receiving a head of said fitting screw.

6. A linear guide rail holding device as claimed in claim 1, wherein said rail has a slider mounted thereon for slidably guiding said slider in the longitudinal direction thereof, said slider being configured to support a machine tool thereon.

7. A linear guide rail holding device for holding a linear guide rail along a linearly extending vertical reference face formed on an installation surface, said linear guide rail having a first side and a second side opposite said first side, wherein said installation surface is provided with an abutting face extending in parallel with said reference face to define therebetween a space in which said linear guide rail is positionable, said holding device comprising:

a pressure contact piece rotatable about a rotational axis thereof and having a lower surface engageable with said installation surface, an upper surface, and a peripheral side surface formed between said lower and upper surfaces, said peripheral side surface having a first engaging face and a second engaging face opposite said first engaging face with respect to said rotational axis such that said first and second engaging faces are pressingly engageable with said first side of said linear guide rail and said abutting face, respectively, to press said second side of said linear guide rail against said vertical reference face, said pressure contact piece being shaped such that the distance from said rotational axis to at least one of said first and second engaging faces gradually increases in a circumferential direction thereof, a screw insertion hole formed in said pressure contact piece and coinciding with said rotational axis, and a screw insertible through said screw insertion hole, said installation surface having a female threaded hole between said vertical reference face and said abutting face with which said screw is threadedly engageable.

8. A linear guide rail holding device as claimed in claim 7, further comprising a tool having at least two operating members, wherein said upper surface of said pressure contact piece is additionally provided with at least two insertion holes corresponding in number to the number of said operating members and arranged along a circle coaxial with said rotational axis such that respective operating members are fittingly engageable with the corresponding insertion holes, so that said pressure contact piece is rotated by operation of said tool with said operating members being in fitting engagement with said insertion holes.

9. A linear guide rail holding device as claimed in claim 7, further comprising a counterbore formed coaxially with said screw insertion hole and having a diameter larger than that of said screw insertion hole for receiving a head of said fitting screw.

10. A linear guide rail holding device as claimed in claim 7, wherein said rail has a slider mounted thereon for slidably guiding said slider in the longitudinal direction thereof, said slider being configured to support a machine tool thereon.

* * * * *